United States Patent [19]
Ward et al.

[11] Patent Number: 5,265,918
[45] Date of Patent: Nov. 30, 1993

[54] HIGH PRESSURE CERAMIC JOINT

[75] Inventors: Michael E. Ward, Poway; Bruce D. Harkins, San Diego, both of Calif.

[73] Assignee: Solar Turbines Incorporated, San Diego, Calif.

[21] Appl. No.: 795,362

[22] Filed: Nov. 20, 1991

[51] Int. Cl.$^5$ .................................................. A16L 5/00
[52] U.S. Cl. .................................... 285/158; 285/284; 285/911
[58] Field of Search ............... 285/284, 290, 911, 289, 285/158; 228/122, 194

[56] References Cited

U.S. PATENT DOCUMENTS

| | | | |
|---|---|---|---|
| 506,484 | 10/1893 | Ewing | 285/297 |
| 526,097 | 9/1894 | Anderson | 285/290 |
| 827,409 | 7/1906 | Bentley | 285/284 |
| 2,876,154 | 3/1959 | Usab | 285/915 X |
| 4,171,832 | 10/1979 | Metcalfe | 285/911 X |
| 4,445,715 | 5/1984 | Inoue et al. | 285/911 X |
| 4,613,167 | 9/1986 | Okohashi et al. | 285/911 X |
| 4,642,864 | 2/1987 | Metcalfe et al. | 228/122 |
| 4,728,128 | 3/1988 | Frey et al. | 285/911 X |
| 4,784,313 | 11/1988 | Maliszewski | 228/194 |

Primary Examiner—Dave W. Arola
Attorney, Agent, or Firm—Larry G. Cain

[57] ABSTRACT

Many recuperators have components which react to corrosive gases and are used in applications where the donor fluid includes highly corrosive gases. These recuperators have suffered reduced life, increased service or maintenance, and resulted in increased cost. The present joint when used with recuperators increases the use of ceramic components which do not react to highly corrosive gases. Thus, the present joint used with the present recuperator increases the life, reduces the service and maintenance, and reduces the increased cost associated with corrosive action of components used to manufacture recuperators. The present joint is comprised of a first ceramic member, a second ceramic member, a mechanical locking device having a groove defined in one of the first ceramic member and the second ceramic member. The joint and the mechanical locking device is further comprised of a refractory material disposed in the groove and contacting the first ceramic member and the second ceramic member. The present joint mechanically provides a high strength load bearing joint having good thermal cycling characteristics, good resistance to a corrosive environment and good steady state strength at elevated temperatures.

18 Claims, 3 Drawing Sheets

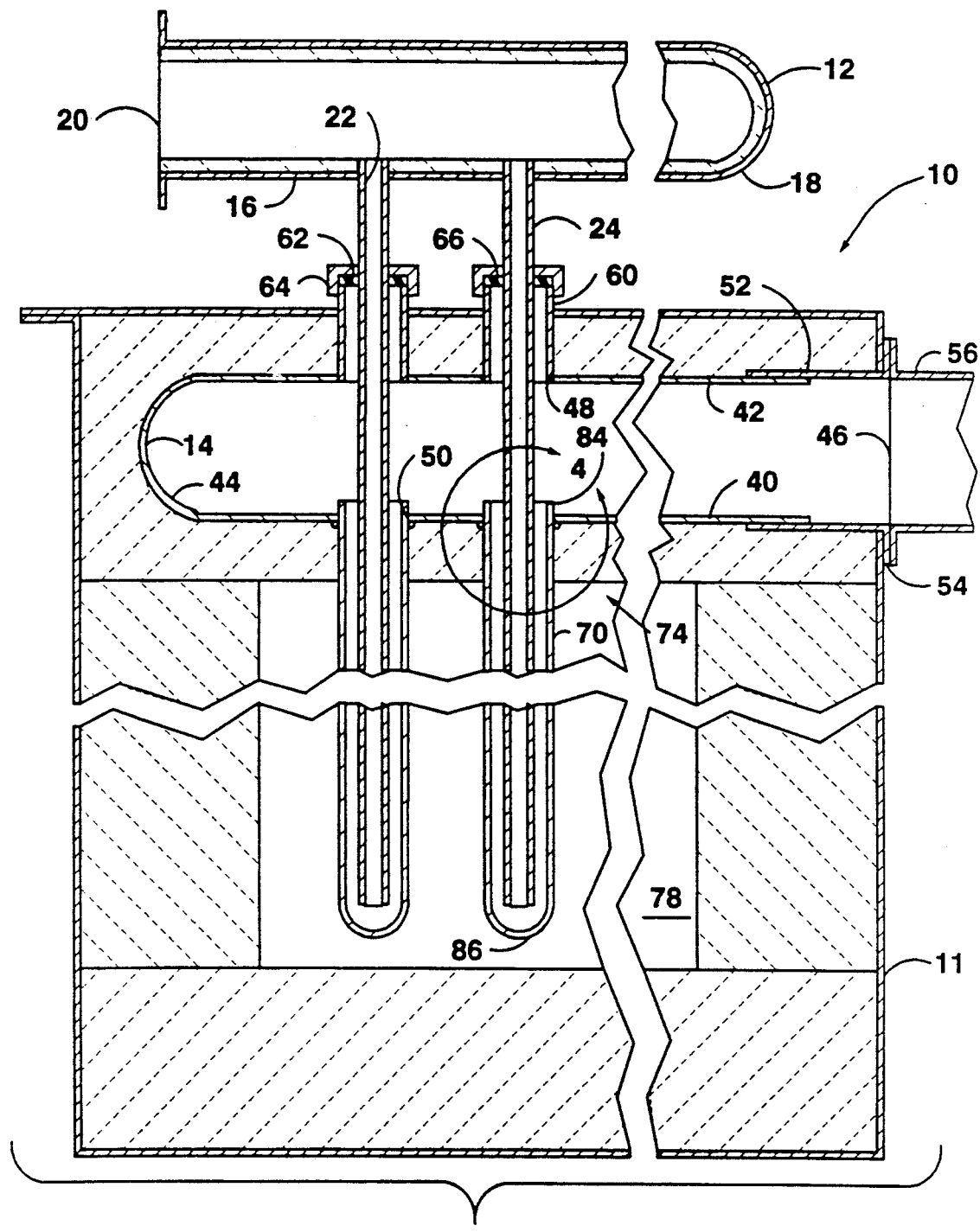
Fig_1_
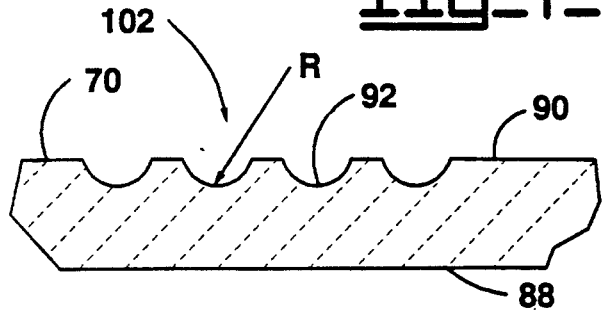
Fig_2_

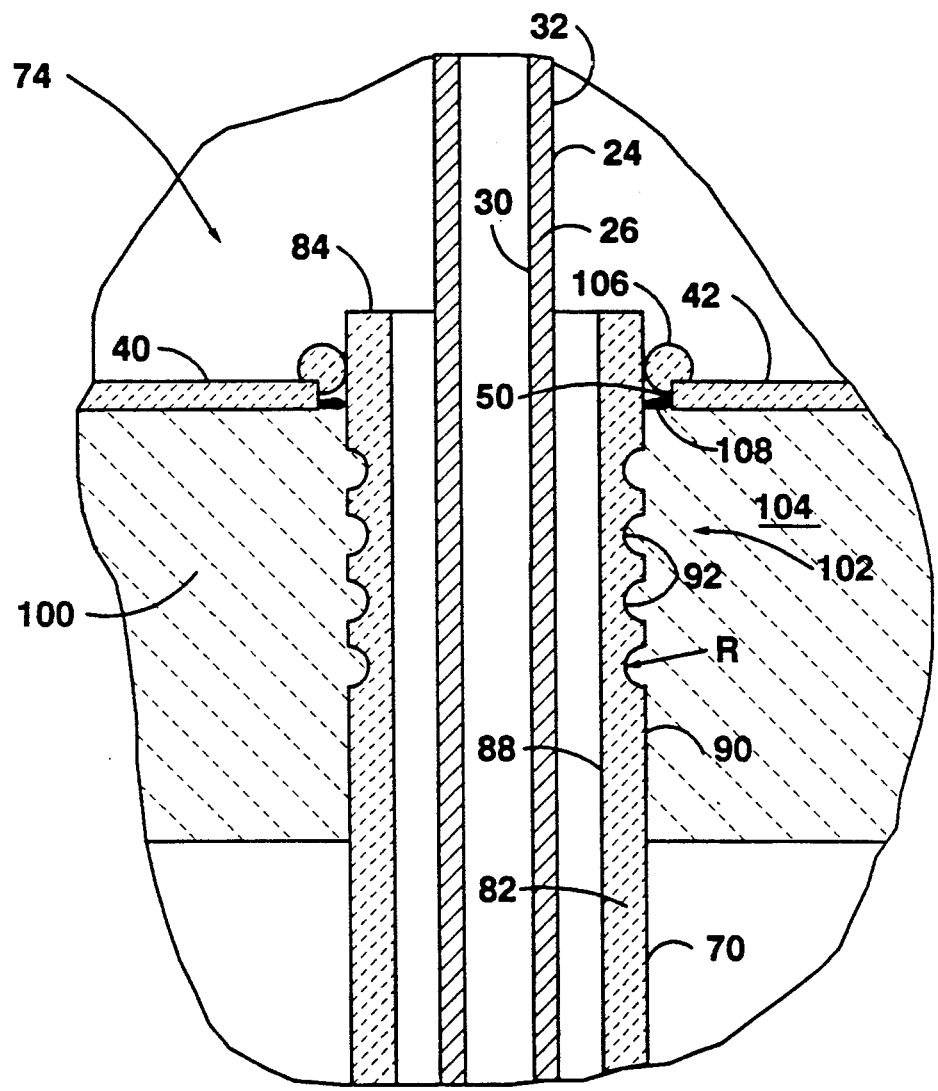
Fig_4_

HIGH PRESSURE CERAMIC JOINT

"The Government has the rights in this invention pursuant to Contract No. DE-FC07-88ID12799 awarded by the U.S. Department of Energy."

DESCRIPTION

1. Technical Field

This invention relates generally to a joint construction for joining a ceramic member to a ceramic member, and more particularly to such a joint construction utilized in a recuperator or heat exchanger tube assembly.

2. Background Art

Present day recuperators and heat exchangers typically used a combination of metal component and ceramic components which must be bonded together. When using dissimilar materials, the joint therebetween is difficult to form, and the use of metal components has several major drawbacks. For example, metal components used in the recuperator or heat exchanger are susceptible to high temperatures and high corrosion gases. Thus, the use of ceramic materials within recuperator and heat exchanger application to resist high temperature and high corrosive conditions has become necessary to provide longevity, serviceability and quality for future applications.

Additional problems are encountered in adapting ceramic material to high temperature heat exchangers. The biggest problem with present tube-type ceramic recuperators centers around the tube to header joints. Specifically, composite ceramic-metal heat exchangers have problems attributable to internal stresses resulting from unlike thermal expansion characteristics of the diverse materials. The internal stresses can cause structural failure and fluid leakage between the high and low pressure sides of the heat exchanger. Additionally, present ceramic-metal heat exchangers are difficult to service and repair.

The increased use of ceramic materials has further emphasized the need for joining ceramic material to other ceramic materials. U.S. Pat. No. 4,784,313 which issued Nov. 15, 1988, to Jerzy Godziemba-Maliszewski, describes a method for bounding silicon carbide molded parts together or with ceramics or metal parts. The above patent discloses that SiC can be firmly bonded to each other or to molded bodies of other ceramic material or to metal work pieces by the establishment of diffusion-welding condition when a metal alloy layer is interposed between cleaned and. polished surfaces.

In U.S. Pat. No. 4,642,864, issued Feb. 17, 1987 to Arthur G. Metcalfe et al., a joint construction for joining ceramic and metallic components for use in a recuperator or heat exchanger tube assembly is disclosed. The joint includes a bonding material cast between a ceramic tube and a metal member. The joint further has a seal member with sufficient ductility within a predetermined thermal operating range which will plastically deform and yet maintain an effective fluid seal between the ceramic and metal members.

The present invention is directed to overcoming one or more of the problems set forth above.

DISCLOSURE OF THE INVENTION

In one aspect of the present invention, a ceramic to ceramic joint is comprised of a first ceramic member and a second ceramic member in spaced relationship. A refractory material contacts the first ceramic member and the second ceramic member and maintaining the spaced relationship. A means is provided for mechanical locking the refractory material with at least one of the first ceramic member and the second ceramic member.

In another aspect of the present invention, a recuperator has a ceramic to ceramic joint therein comprised of a first ceramic member having an aperture defined therein and a second ceramic member having an open end, an outer surface and a plurality of grooves positioned near the open end and defined within the outer surface. Each of the grooves has a preestablished width and a preestablished distance therebetween. The second ceramic member is positioned within the aperture in spaced relationship thereto. A refractory material is disposed within the grooves and contacts the first ceramic member and the second ceramic member. A seal member is interposed between the first ceramic member and the second ceramic member.

In another aspect of the present invention, a ceramic to ceramic joint is comprised of a first ceramic member spaced a preestablished distance from a second ceramic member. The second ceramic member has an outer surface and a plurality of grooves defined within the outer surface. Each of the grooves has a preestablished width and a preestablished distance therebetween. A refractory material is disposed between the first ceramic member and the second ceramic member. The refractory material is formed by casting, in situ, an aqueous slurry of the refractory material. The refractory material is disposed in at least a portion of each of the grooves and contacts the first ceramic member and the second ceramic member. A seal member is interposed between the first ceramic member and the second ceramic member and softens without melting within a predetermined thermal operating range to provide an effective fluid seal between the first ceramic member and the second ceramic member at the predetermined range.

BRIEF DESCRIPTION OF THE DRAWINGS

FIG. 1 is a sectional view of a duct and a recuperator embodying the present invention;

FIG. 2 is an enlarged partial sectional view of a configuration of a plurality of grooves defined within the ceramic tube;

FIG. 4 is an enlarged sectional view similar to FIG. 3 of an alternate joint.

BEST MODE FOR CARRYING OUT THE INVENTION

Figure 3:
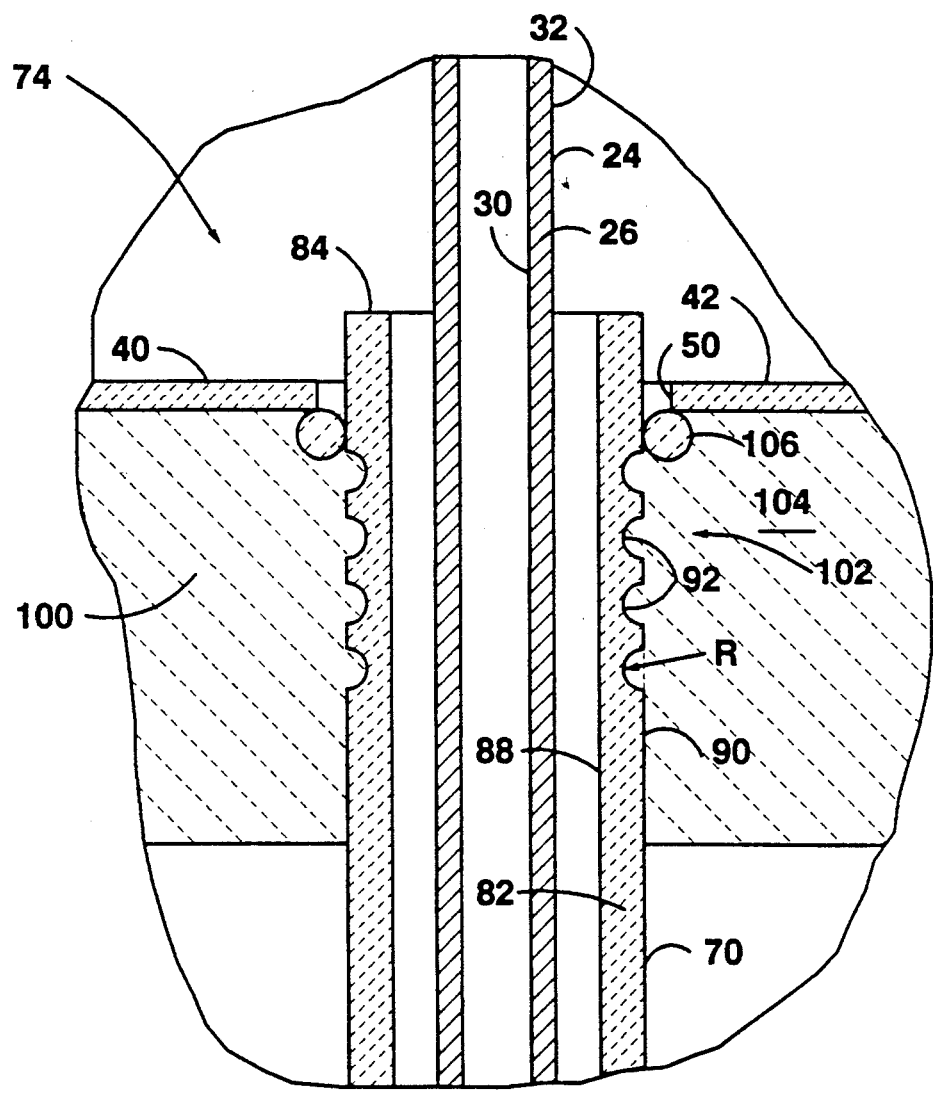
FIG. 3 is an enlarged sectional view of a joint encompassed by the line 6 of FIG. 1.

As best shown in FIG. 1, a recuperator or heat exchanger 10 is shown being at least partially positioned within a duct 11. The heat exchanger 10 includes an air inlet manifold 12 and an air outlet manifold 14. The air inlet manifold 12 has a generally cylindrical configuration and is substantially formed by a cylindrical wall 16 having a closed end 18 and an open end 20. The air inlet manifold 12 is made from a metal pipe having a 6.35 mm wall thickness and the closed end 18 being formed thereon. A plurality of openings 22 are defined in the wall 20 and are axially positioned in preestablished spaced relation one to another. A metallic tube 24 is disposed within each of the plurality of openings 22 and is fixedly attached thereto in a conventional manner. As further shown in FIG. 4, each of the metallic tubes 24 is comprised of a wall 26 defined by an outer diameter and an inner diameter. The wall 26 further defines an inner cylindrical surface 30 and an outer cylindrical surface 32. Each of the tubes 24 have opposite ends which are open. The end of the tube 24 which is disposed within the opening 22 extends beyond the wall 16 a preestablished length. The air inlet manifold 12 is coated internally with an insulating material 34 having a thickness equal to the preestablished length of the metallic tube 24 extending beyond the wall 16.

The air outlet manifold 14 includes an outer ceramic composite header or first ceramic member 40 having a generally cylindrical configuration. The header 40 includes a cylindrical wall member 42 being made of a metal or ceramic material and having a closed end 44 and an open end 46. The wall member 42 has a 127 mm inside diameter and the wall member 42 has a 6.35 mm wall thickness. The outer portion of the header 40 is made of a continuous fiber reinforced ceramic composite material or refractory material of silicon carbide/silicon carbide composite. Nicalon fiber, a silicon carbide is used as the fiber for fabrication of the preform and the matrix deposition process to form the composite material. One such commercially available material is sold by Atlantic Research Corporation in Chatsworth, Calif. 91311. Other examples of alternate materials are Hexaloy SA SiC manufactured by Carborundum, SiC-odide composite manufactured by Lanxide or Sic manufactured by INEX. A plurality of apertures 48 are defined within the wall member 42 and are axially spaced apart to coincide with the preestablished spaced relationship of the plurality of openings 22 in the air intake manifold 12. A plurality of openings 50 are defined within the wall member 42 opposite the plurality of apertures 48 and are axial aligned therewith. The open end 46 of the header 40 is surrounded by a metallic ring 52 having a flange 54 thereon. The metallic ring 52 is sealingly attached to the header 40. The flange 54 has a duct 56 attached thereto to fluidly communicate the heated gaseous fluid away from the heat exchanger 10. A plurality of metal tubes 60 are sealingly positioned within the apertures 48 and have a threaded end 62 extending beyond the wall member 42. Each of the metal tubes 60 have a threaded nut 64 having a seal 66 therein attached thereto.

A plurality of ceramic tubes or second ceramic members 70 are ed within the openings 50 defined within the wall member 42. Each tube 70 is positioned within each of the openings 50 in spaced relationship thereto. As will be explained later, a sealed joint 74 is formed between the manifold 14 and each of the ceramic tubes 70. The heat exchanger 10 is positioned within the conventional furnace or flue gas duct 11 having a cavity 78 therein.

Each of the ceramic tubes 70 has a hollow, elongate ceramic tube configuration. Each tube 70 has an outside diameter of about 50.8 mm and a wall 82 having a preestablished thickness of about 4.76 mm. Each tube 70 further has an inner diameter, an upper open end 84 and a closed end 86 space therefrom. The wall 82 further defines an inner surface 88 and an outer surface 90. Each tube 70 is formed of a refractory cast SiC material. Like the header 40, each of the tubes 70 is a monolithic silicon carbite structure. one such commercially available material is sold by the Carborundum Company, at P.O. Box 1054, Niagara Falls, N.Y. 14302 under the trade name Hexaloy SA. Other examples of alternate materials are Alumina Toughened with SiC Particles (LAS) manufactured by the Lanxide Corporation, Crystar CS101K Sic manufactured by the Norton Company, Reaction Bonded SiC (RBSC210) manufactured by the Coors Ceramics Company, and Alumina AD-998 also manufactured by the Coors ceramics Company.

As best shown in FIGS. 3 and 6, a plurality of axially spaced annular grooves 92 are formed in each of the tubes 70 near the upper open end 84 intermediate the ends 84,86. The grooves 92 have a preestablished distance therebetween and extend from the outer surface 90 into each tube 70 to a depth of not more than one third the depth of the preestablished wall thickness. The grooves 92 have a profile defined by an arcuate configuration. Each of the grooves 92 have a preestablished width, formed by a cordal length extending along the outer surface 90 of the tube 70 when each groove 92 is formed. For example, the preferred groove configuration of each of the grooves 92 is defined by a radius of about 6.35 mm and has a distance between each groove of about 3.17 mm and a depth of about 1.5 mm.

Several alternate embodiments of a groove 92 configuration of the present invention have been tested and are disclosed herewith. For example, individual grooves were defined by a radius of about 1.59 mm and a distance between grooves of about 3.17, a radius of about 3.17 mm and a distance between grooves of about 3.17 mm or a radius of about 15.8 mm and a distance between each groove of about 3.17 mm. Experimentation has shown that the groove 92 configurations defined by a radius of less than above 1.0 mm and above about 15.8 mm decreases the bond strength as a function of the groove 92 width. The optimum groove 92 is related to the particle size and particle size distribution of the refractory powder and to the cordal length of the groove 92.

As best shown in FIG. 1 and 4, the outer diameter of each metallic tube 24 is less than the inner diameter of each ceramic tube 70. Each of the metallic tubes 24 coaxially extends inside one of the ceramic tube 70 so that the distal end of the metallic tube 24 is near the lower, or closed end 86 of the ceramic tube 70. The positioning of each of the plurality of metallic tubes 24 within the plurality of ceramic tubes 70 form a tube-within-a-tube relationship. The outer surfaces 32 of each of the metallic tubes 24 can be maintained in concentric relationship with the inner surface 88 of the ceramic tube 70 by suitable spacers, not shown, thereby defining a uniform annular passage 94 between the outer surface 32 of the metallic tube 24 and the inner surface 88 of the ceramic tube 70.

The sealed joint 74 includes the ceramic header 40, one of the ceramic tubes 70, a refractory 100 and a means 102 for mechanically locking the refractory material 100 with at least one of the first ceramic member 40 and the second ceramic member 70. The mechanical locking means 102 includes the plurality of grooves 92 defined in the ceramic tubes 70. A portion of the refractory material 100 interposed into the grooves 92 is included in the mechanical locking means 102. As an alternative to the plurality of annular grooves 92, a plurality of raised portions or flanges, a spiral groove or a series of radially spaced axially formed grooves, not shown, could be formed or attached to each of the ceramic tubes 70. The refractory material 100 is constructed of a fiber reinforced refractory material.

A mold or casing, not shown, having a plurality of openings defined therein corresponding in position to the metallic tubes 24 and the ceramic tubes 70 is positioned about the header 40 in spaced relationship thereto forming a chamber 104. Poured or cast into the chamber 104 is the refractory material 100 mechanically interlocking and fixedly attaching the components and forming the sealed joint 74. For example, the refractory material 100 is a dense castable material having a composition by weight, of about 70% $Al_2O_3$, 25% $SiO_2$, and 5% trace elements. One such commercially available material is sold by Babcock and Wilcox Co., New York, N.Y., under the trademark name Kaocrete 32-C. This material, as purchased is a mixture of aggregate and fine particles, the fine particles comprise about 60% of the total mixture and are defined as that portion of the mixture that will pass a no. 18 sieve, i.e., a sieve having a nominal opening of about 1.0 mm. The fiber reinforcement use is this application is steel fibers or whiskers which is mixed in the ratio of about 1.4 kgs of fibers to every 45.4 kgs of refractory. However, if corrosion occurs and degradation of strength is determined to be a major problem, the use of high strength alloy fibers can be substituted to reduce the corrosion.

Further included in the sealed joint 74 is a seal member 106 interposed between and in sealing contact with the first ceramic member 40 and the second ceramic member 70. The seal member 106 is an ORing or washer which is placed around the outer diameter of each tube 70 near the upper open end 84. The seal member 106 has an inner diameter substantially equal to or slightly smaller than the outer diameter of the ceramic tube 70 and an outer diameters larger than the diameter of the individual opening 50. The refractory material 100 is substantially a brittle member whereas the seal member 106 is constructed of a material that softens and is somewhat ductile at the design or intended operating temperature of the sealed joint 74. Specifically, the seal member 106 is desirably constructed of a glass material having sufficient ductility within a predetermined thermal operating range to plastically deform relative to the refractory material 100 or the ceramic header 40 and the ceramic tube 70. The seal member 106, however, remains a solid, continuous body capable of providing an effective seal between the ceramic header 40 and the ceramic tube 70 of the sealed joint 74. Examples of suitable types of glasses and their corresponding effective ductile-sealing ranges are as follows:

A. Single phase borosilicate glass, 760 to 871 degrees Centigrade.

B. Single phase calcium-barium borosilicate glass, 760 to 816 degrees Centigrade.

C. Two phase aluminosilicate glass, 899 to 1093 degrees Centigrade.

D. Quartz glass, 1371 to 1665 degrees Centigrade.

As an alternative and best shown in FIG. 7, the seal member 106 could be positioned about the outer diameter of the ceramic tube 70 after the ceramic tube 70 has been inserted into the respective one of the openings 50. For example, in this alternative, each of the plurality of ceramic tubes 70 is positioned in respective ones of the openings 50. A glue or filler 108, such as epoxy, can be used to position the outer diameter of the ceramic tube 70 in spaced relationship to the header 40 prior to the casting of the refractory material 100 in the chamber 104. After the refractory material 100 has hardened, the seal member 106 is positioned about the outer diameter of the portion of the open end 84 extending beyond the cylindrical wall member 42. The seal member 106 is then heated to a near liquid state and partially fills the space formed between the ceramic tube 70 and the opening 50.

INDUSTRIAL APPLICABILITY

In application, the recuperator 10 including the ceramic to ceramic sealed joint 74 is assembled in the following manner. The metallic tubes 24 are positioned within the respective plurality of openings 22 within the cylindrical wall 16 of the air inlet manifold 16 and are fixedly attached to the wall 16. After assembly, the internal surface of the inlet manifold 16 is coated with the refractory material in a conventional manner. The next item to be assembled thereto is the air outlet manifold 14. The threaded nut 64 with the seal 66 positioned therein is threadedly engaged onto the threaded end 62 of each of the metal tubes 60. The assembled nut 64, seal 66 and metal tube 60 of each of the metal tubes 60 are positioned about the outer surface 32 of respective metallic tubes 24 and the nut 64 is tighten on the threaded end 62 and the seal 66 positions the metal tubes 60 relative to the air inlet manifold 16. The metal tubes 60 are positioned within the respective apertures 48 in the ceramic composite header 40 and the metallic tubes 24 extend through the respective ones of the openings 50 in the header 40. Each of the ceramic tubes 70 has the glass seal member 106 positioned around the outside diameter in contact with the outer surface 90 near the open end 84. The ceramic tubes 70 are positioned about respective ones of the metallic tubes 24 and are inserted into the respective openings 50. Each of the ceramic tubes 70 have the open end 84 extending beyond the wall member 42 by about 6 mm and have the glass seal member 106 contacting the header 40.

Thus, the refractory material 100 is ready to be applied to the air outlet manifold 14 fixedly attaching the components one to another. The mold or casing having the openings through which the metallic tubes 24 and the ceramic tubes 70 extend is positioned about the header 40 in spaced relationship thereto forming the chamber 104. The refractory material 100 is poured or cast into the chamber 104 where upon after drying fixedly attach the components and form the sealed joint 74. For example, the castable refractory material 100 flows into the chamber 104 fills the plurality of grooves 92, contacts the outer surface 90 and the cylindrical wall member 42. Thus, a mechanical joint is formed which provides a high strength load bearing joint being resistant to sheer depending on the refractory material being used, having good thermal cycling characteristics, good resistance to a corrosive environment and good steady state strength at elevated temperatures.

The sealed joint 74 of the present application is used with the recuperator 10 which is partially disposed within and attached to the flue gas duct 11 of a conventional furnace. In operation, high pressure gaseous fluid or recipient fluid, which in this application is air, to be heated enters the open end 20 of the inlet manifold 12. From the inlet manifold 12, the air passes through the metallic tubes 24 and exits the open end of each of the metallic tubes 24. The air passes along the inner surfaces 88 absorbing heat from the high temperature low pressure gases or donor fluid of combustion passing through the duct 11. The heat from the combustion gasses is transferred from the outer surfaces 90 through the walls 82 to the inner surfaces 88 to be absorbed by the air. The heated air rises through the uniform annular passages 94 between the outer surfaces 32 of the metallic tubes 24 and the inner surfaces 88 of the ceramic tubes 70 and exits into the air outlet manifold 14. The heated air exits the outlet manifold 14 through the open end 46 and is used in a conventional manner.

The seal member 106 provides an effective seal even through the more brittle refractory material 100 may crack under repeated thermal stress loading. The glass seal member 106, because of its selected material properties, softens somewhat at the designed operating temperatures, does not crack, but does comply with the adjacent materials, and thereby provides a blockage to the flow of gases between the ceramic header 40, the refractory material 100 and the individual tubes 70.

Other aspects, objects and advantages will become apparent from a study of the specification, drawings and appended claims.

We claim:

1. A ceramic to ceramic joint comprising:
   a wall member having an opening within the wall;
   a ceramic member having a generally tubular configuration being smaller than the opening in the wall member and being generally centered in spaced relationship within the opening;
   a refractory material being is frictional contact with said wall member and being in frictional contact with said ceramic member and mechanically maintaining said spaced relationship therebetween; and
   means for mechanical locking the refractory material with said ceramic member, said mechanical locking means includes a groove positioned in the ceramic member and said refractory material generally filling the groove forming a high strength load bearing joint.

2. The ceramic to ceramic joint of claim 1 wherein said refractory material includes a fiber reinforcement.

3. The ceramic to ceramic joint of claim 2 wherein said fiber reinforcement is added to said refractory material in a ratio of about 0.3 to 2 kgs of reinforcement to about every 45.4 kgs of refractory.

4. The ceramic to ceramic joint of claim 3 wherein said fiber reinforcement added to said refractory material is in the ratio of about 1.4 kgs to 45.4 kgs respectfully.

5. The ceramic to ceramic joint of claim 1 wherein said mechanical locking means includes a plurality of axially spaced annular grooves positioned in the ceramic member.

6. The ceramic to ceramic joint of claim 5 wherein said grooves have a preestablished width and a preestablished distance therebetween.

7. The ceramic to ceramic joint of claim 6 wherein said preestablished distance between said grooves is equal.

8. The ceramic to ceramic joint of claim 7 wherein said preestablished distance between said grooves is at least 3 mm.

9. The ceramic to ceramic joint of claim 6 wherein said ceramic member has a preestablished wall thickness and said grooves have a depth of not more than one third the thickness of the preestablished wall thickness.

10. The ceramic to ceramic joint of claim 9 wherein each of said grooves have a profile defined by an arcuate radius.

11. The ceramic to ceramic joint of claim 10 wherein said arcuate profile is formed by a radius having a range of between about 1.5 mm to 12 mm.

12. The ceramic to ceramic joint of claim 11 wherein said arcuate profile is formed by a radius of about 3 mm.

13. The ceramic to ceramic joint of claim 6 wherein said width of each of said plurality of grooves is about 6 mm.

14. The ceramic to ceramic joint of claim 1 further including a seal member between said wall member and said ceramic member and being in contacting relationship therewith.

15. The ceramic to ceramic joint of claim 14 wherein said seal member softens without melting within a predetermined thermal operating range to provide an effective fluid seal between said wall members and said ceramic member at said predetermined range.

16. The ceramic to ceramic joint of claim 1 wherein said refractory material is a dense castable refractory material.

17. The ceramic to ceramic joint of claim 16 wherein said refractory material comprises a blend of about 40% by weight aggregate particles and about 60% by weight fine particles.

18. The ceramic to ceramic joint of claim 17 wherein said refractory material is a composition of 70% by weight $Al_2O_3$, 25% by weight $SiO_2$, and 5% by weight trace elements.

* * * * *